United States Patent
Cha et al.

(10) Patent No.: US 7,395,100 B2
(45) Date of Patent: Jul. 1, 2008

(54) PORTABLE COMMUNICATION APPARATUS HAVING KEYS MOVED UP/DOWN BY ROTATION

(75) Inventors: Seong-Won Cha, Gwangju (KR); In-Gon Park, Seoul (KR); Chang-Soo Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 358 days.

(21) Appl. No.: 11/221,127

(22) Filed: Sep. 7, 2005

(65) Prior Publication Data

US 2006/0111161 A1 May 25, 2006

(30) Foreign Application Priority Data

Nov. 24, 2004 (KR) ............... 10-2004-0096827

(51) Int. Cl.
*H04M 1/00* (2006.01)
(52) U.S. Cl. .............. 455/575.1; 455/575.4; 455/550.1; 345/168
(58) Field of Classification Search .............. 455/575.1, 455/575.4, 550.1; 345/168
See application file for complete search history.

(56) References Cited

U.S. PATENT DOCUMENTS

| | | | | |
|---|---|---|---|---|
| 6,087,600 A | * | 7/2000 | Kaufmann et al. ......... 200/5 A |
| 6,590,565 B2 | * | 7/2003 | Hosoya ....................... 345/168 |
| 6,821,036 B2 | * | 11/2004 | Horiuchi ..................... 400/490 |
| 7,035,088 B2 | * | 4/2006 | Pihlaja et al. ............... 361/679 |
| 2001/0033269 A1 | * | 10/2001 | Hosoya ....................... 345/168 |
| 2003/0080880 A1 | * | 5/2003 | Kaino et al. .................. 341/22 |
| 2005/0073515 A1 | * | 4/2005 | Kee et al. .................... 345/204 |
| 2005/0128686 A1 | * | 6/2005 | Pihlaja et al. ............... 361/679 |
| 2006/0017929 A1 | * | 1/2006 | Jung et al. .................. 356/419 |
| 2006/0063569 A1 | * | 3/2006 | Jacobs et al. ............. 455/575.1 |
| 2007/0117597 A1 | * | 5/2007 | Karan ...................... 455/575.1 |
| 2007/0155451 A1 | * | 7/2007 | Lee .......................... 455/575.4 |
| 2007/0218963 A1 | * | 9/2007 | Kim ......................... 455/575.4 |

* cited by examiner

*Primary Examiner*—Matthew Anderson
*Assistant Examiner*—Minh Dao
(74) *Attorney, Agent, or Firm*—The Farrell Law Firm, PC

(57) ABSTRACT

A portable communication apparatus equipped with up/down keys. The portable communication apparatus includes a main housing, a sliding housing adapted to slide to be opened and closed while continuously facing the main housing, a number of keys arranged in a predetermined position on the top surface of the main housing and adapted to be moved up to be exposed and moved down to be hidden, when the sliding housing is opened and closed, respectively, and an elastic body positioned below the keys to provide a force for moving them up.

15 Claims, 5 Drawing Sheets

PORTABLE COMMUNICATION APPARATUS HAVING KEYS MOVED UP/DOWN BY ROTATION

PRIORITY

This application claims priority to an application entitled "Portable Communication Apparatus Having Keys Moved Up/down by Rotation" filed with the Korean Intellectual Property Office on Nov. 24, 2004 and assigned Serial No. 2004-96827, the contents of which are hereby incorporated by reference.

BACKGROUND OF THE INVENTION

1. Field of the Invention

The present invention relates generally to digital communication apparatuses including cellular phones, PDAs (Personal Digital Assistants), HHPs (Hand Held Phones), camera phones, game phones, and message phones, and more particularly to a sliding-type portable digital communication apparatus having keys that move up and down by rotational motion caused by sliding the slidable portion of the portable digital communication apparatus.

2. Description of the Related Art

In general, "portable communication apparatus" refers to an electronic apparatus that a user can carry to perform wireless communication with a desired partner. In consideration of portability, designs of such portable communication apparatuses have tended toward compactness, slimness, and lightness, and more recently, toward multimedia availability, having a wider variety of functions. More specifically, future portable communication apparatuses are expected to incorporate greater multi-functionality and multi-purpose utilization, as well as greater compactness and lightness. Also, these future portable communication apparatuses will be modified to be suitable for various multimedia environments or Internet environments.

Commonly, conventional portable communication apparatuses are classified into various categories according to their appearance, such as bar-type portable communication apparatuses, flip-type portable communication apparatuses, and folder-type portable communication apparatuses. The bar-type communication apparatuses have a single housing shaped like a bar. The flip-type communication apparatuses have a flip portion, which is rotatably coupled to a bar-shaped housing by a hinge device. The folder-type communication apparatuses have a folder which is connected to a single bar-shaped housing by a hinge device in such a manner that the folder can be rotated to fold on or unfold from the housing.

Portable communication apparatuses may also be classified into neck wearable type communication apparatuses and wrist wearable type communication apparatuses according to the position at or the way in which a user puts on the communication apparatus. Obviously, the neck wearable type communication apparatus is one that a user wears around the neck using a string, and the wrist wearable type communication apparatus is one, which a user wears around the wrist.

In addition, portable communication apparatuses may be classified into rotation-type communication apparatuses and sliding-type communication apparatuses according to ways of opening and closing the communication apparatuses. In the rotation-type portable communication apparatuses, two housings are coupled to each other in such a manner that one housing rotates to be opened or closed relative to the other while they face each other. In the sliding-type portable communication apparatuses, two housings are coupled to each other in such a manner that one housing slides along a longitudinal direction to be opened or closed relative to the other. These variously classified portable communication apparatuses are easily understood by those skilled in the art.

Recently, conventional portable communication apparatuses tend to have a function of transmitting data at a high speed in addition to the basic function of performing voice communication. That is, according to the increase of demand by consumers, portable communication apparatuses now tend to provide a service using a wireless communication technology capable of transmitting data at a high speed.

Further, recent portable communication apparatuses tend to be equipped with a camera lens for transmission of video signals. That is, current portable communication apparatuses have an external or imbedded camera lens module, which enables a user to perform video communication with a desired partner or to take photographs of a desired subject.

However, keypads used in conventional portable communication apparatuses have a problem in that the top surfaces of the keys are positioned on the same plane and more accuracy in key pressing operation is necessary. More specifically, in practice, users must accurately press the top surface of a desired key with a finger to input data accurately. Without such operation, erroneous key pressing occurs frequently and the speed of key pressing operation decreases. Furthermore, a data input device is necessary that can implement key pressing operation more rapidly and accurately in a busy or urgent situation.

SUMMARY OF THE INVENTION

Accordingly, the present invention has been designed in order to solve the above and other problems occurring in the prior art. An object of the present invention is to provide a sliding-type portable communication apparatus capable of maintaining key tops of keys moved up, when the sliding housing is open, for convenient key pressing operation.

Another object of the present invention is to provide a portable communication apparatus having key tops of keys that automatically move up, as the sliding housing is opened, for convenient use.

Still another object of the present invention is to provide a portable communication apparatus having keys that moved up and down depending on the movement of the sliding housing.

In order to accomplish the above and other objects, there is provided a sliding-type portable communication apparatus including a main housing, a sliding housing adapted to slide to be opened and closed while continuously facing the main housing, a number of keys arranged in a predetermined position on the top surface of the main housing and adapted to be moved up and exposed or moved down and hidden, based on the movement of the sliding housing, and an elastic body positioned below the keys to provide a force for moving the keys up.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. In the following description of the present invention, a detailed description of known functions and configurations incorporated herein will be omitted when it may make the subject matter of the present invention unclear.

Figure 1:
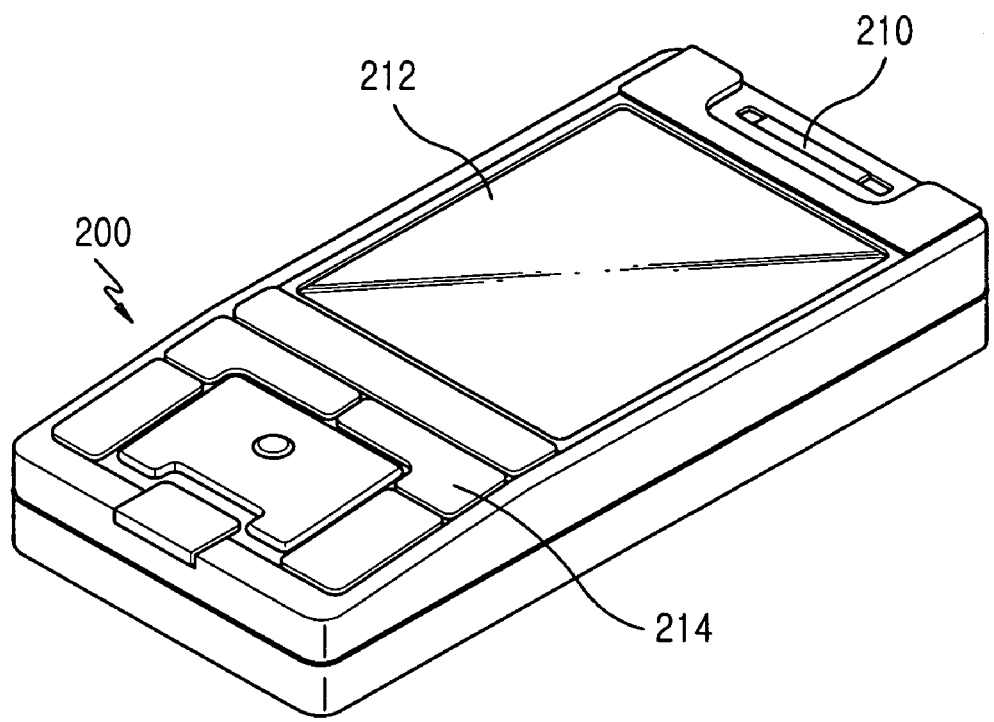
FIG. 1 is a perspective view illustrating a portable communication apparatus having up/down keys hidden according to a preferred embodiment of the present invention.
Figure 2:
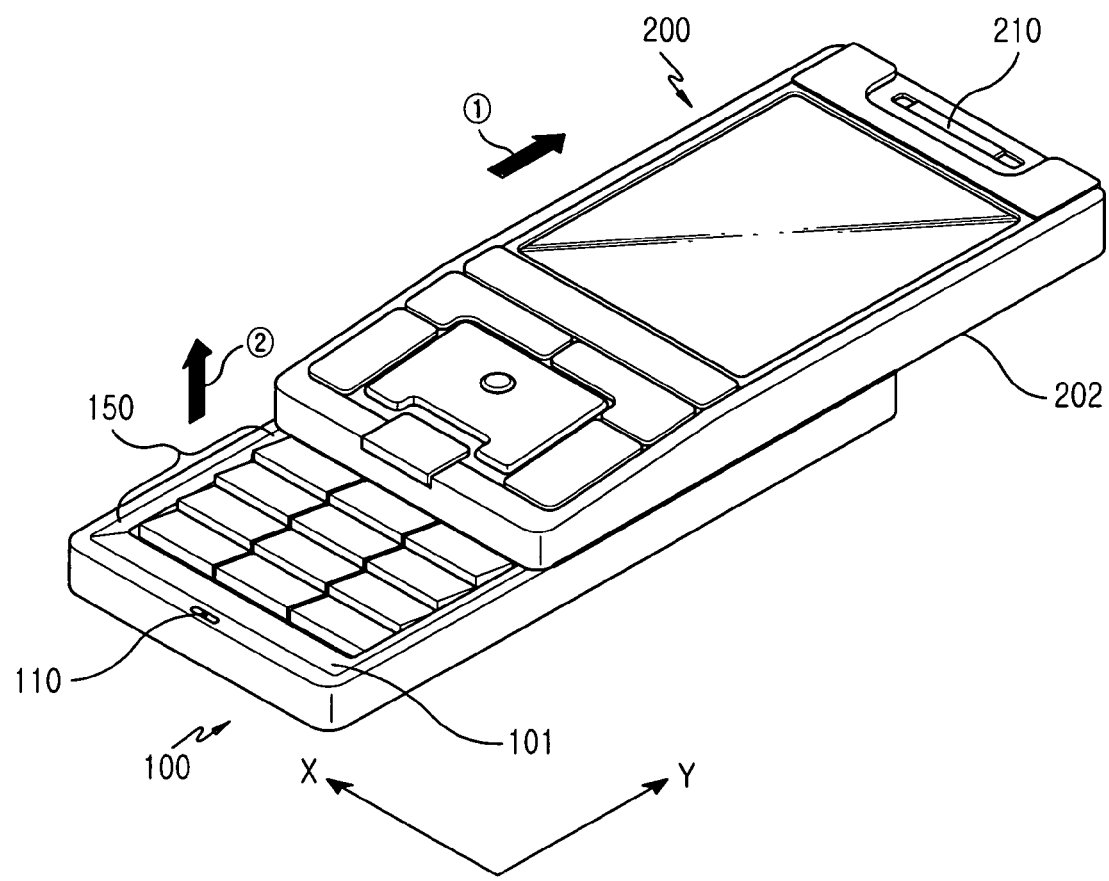
FIG. 2 is a perspective view illustrating a portable communication apparatus having up/down keys exposed according to a preferred embodiment of the present invention.
Figure 3:
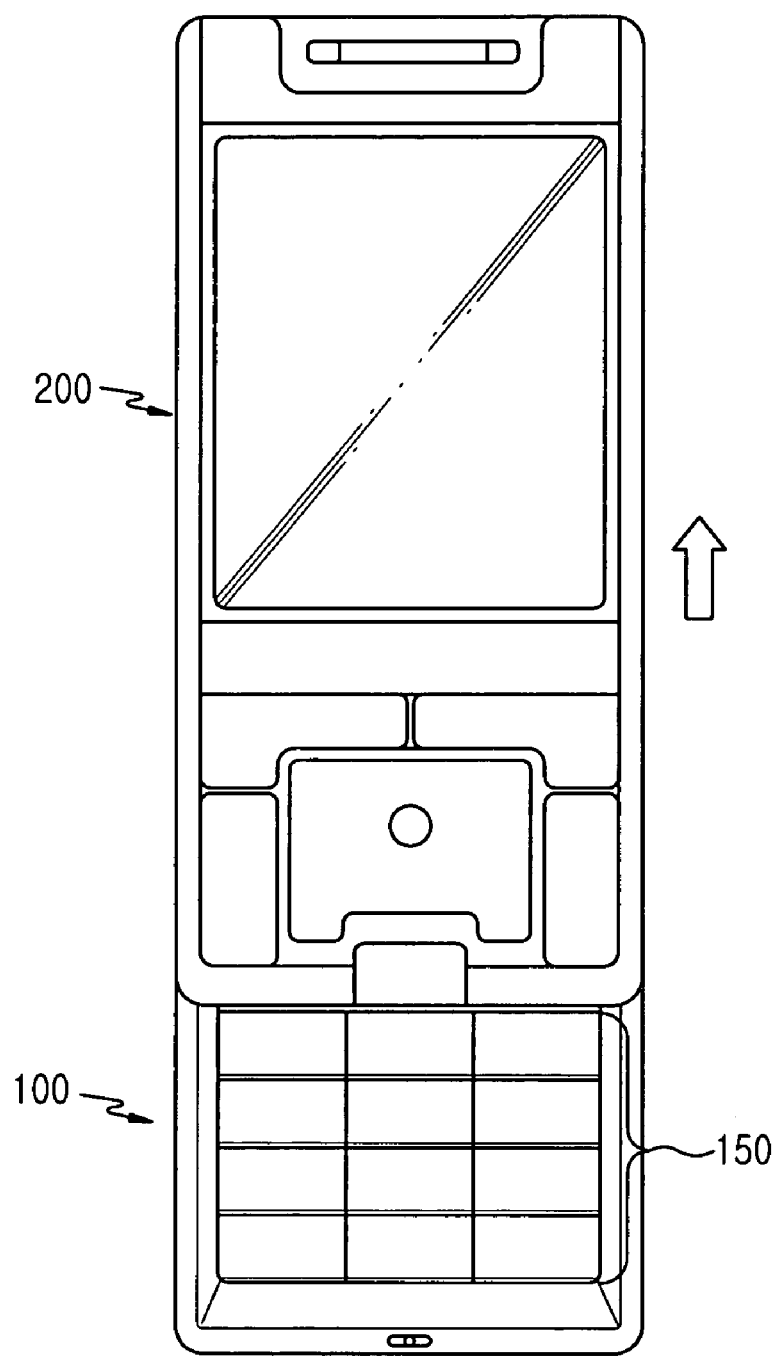
FIG. 3 is a front view of the portable communication apparatus illustrated in FIG. 2.

As illustrated in FIGS. 1 to 3, a sliding type portable communication apparatus is equipped with keys 150 according to the present invention. The sliding-type portable communication apparatus includes a main housing 100 and a sliding housing 200 that slides opened and closed, while continuously facing the main housing 100. More specifically, the top surface 101 of the main housing 100 and the bottom surface 202 of the sliding housing 200 face each other while the sliding housing 200 travels linearly.

As indicated above, the portable communication apparatus according to the present invention includes a number of keys 150 arranged on the top surface 101 of the main housing 100. The keys 150 move up and are exposed to the exterior, or move down and are hidden, depending based on movement of the sliding housing 200.

Additionally, an elastic body, which is preferably positioned vertically below the keys 150, provides a force for moving the keys 150 up. During upward movement of the keys 150, key tops are moved up by rotational motion and, during downward movement thereof, the key tops are moved down by reverse rotational motion.

Referring to FIG. 2, arrow ① indicates the direction in which the sliding housing 200 is opened from the main housing 100 and arrow ② indicates the direction in which the keys 150 are moved as the sliding housing 200 is opened. More specifically, the keys 150 are pushed down by sliding surface contact with the bottom surface 202 of the sliding housing 200, as the sliding housing 200 is closed. Further, the keys are released from the constraint of the bottom surface 202 of the sliding housing 200 and move up, as the sliding housing 200 is open.

In FIG. 2, the X-axis corresponds to the traverse direction of the main housing 100 and the Y-axis corresponds to the longitudinal direction thereof. The traverse direction of the main housing 100 is perpendicular to the sliding direction of the sliding housing 200 and the longitudinal direction thereof is identical to the sliding direction.

Preferably, the keys 150 are successively arranged in the sliding direction of the sliding housing 200, as well as in a direction perpendicular to the sliding direction thereof, in a matrix shape (i.e., 3×4 array).

Figure 4:
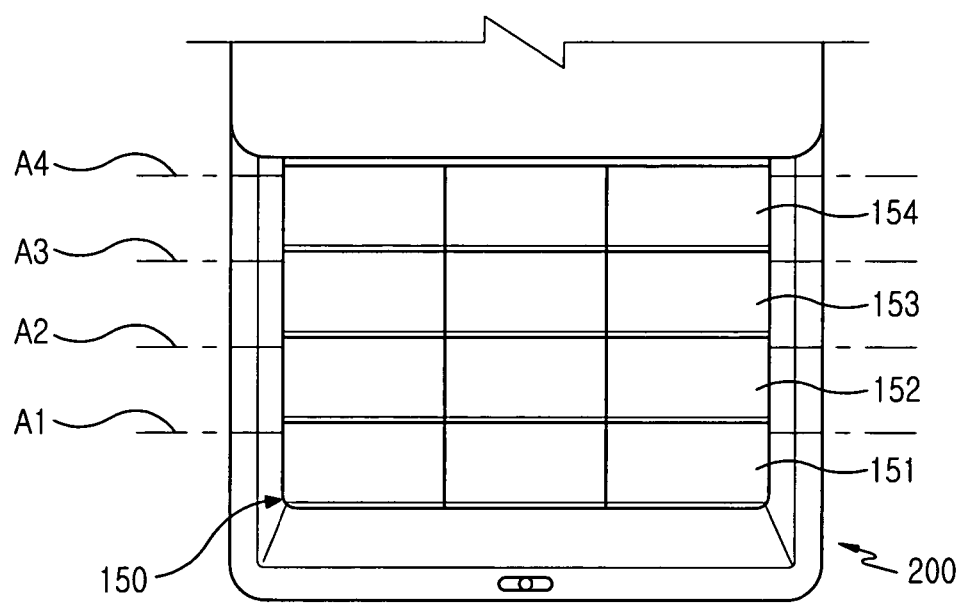
FIG. 4 is a front view illustrating in part a portable communication apparatus having up/down keys exposed according to a preferred embodiment of the present invention.

The construction of the keys 150 used in the portable communication apparatus according to the present invention will now be described with reference to FIGS. 4 and 5. As illustrated in FIG. 4, traverse keys 151, 152, 153, and 154 of the keys 150 have respective key tops connected thereto in such a manner that the key tops can rotate about a number of corresponding hinge axes A1, A2, A3, and A4, which are oriented in the traverse direction of the main housing 100 while being arranged in the longitudinal direction of the main housing 100, respectively. The keys 150 are positioned adjacent to one another in traverse and longitudinal directions of the main housing 100, leaving fine gaps between the keys 150 for rotational movement thereof.

Figure 5:
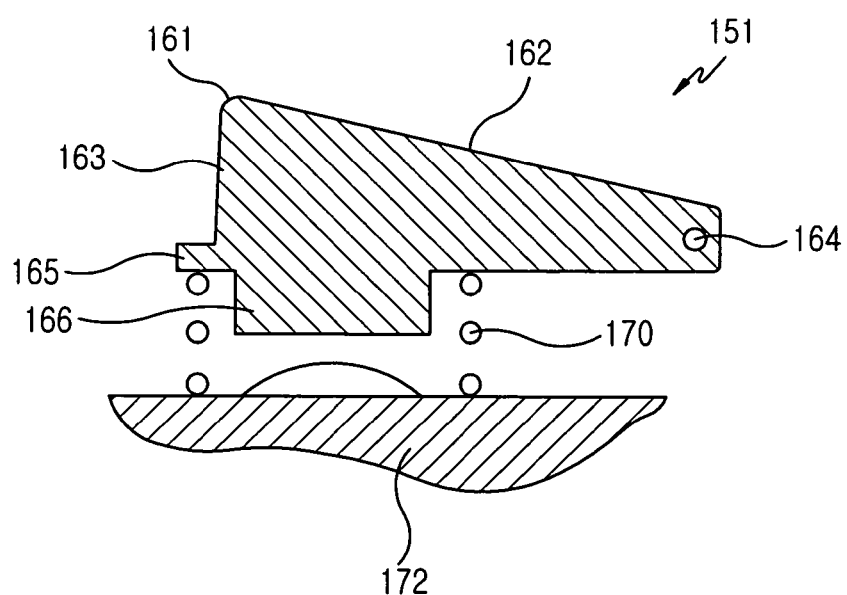
FIG. 5 is a sectional view illustrating up/down keys according to a preferred embodiment of the present invention.

Referring to FIG. 5, for example, one of the traverse keys 151 includes a key top 161 positioned on the top surface thereof, a first slant surface 162 positioned next to a side of the key top 161, a vertical second slant surface 163 positioned next to the other side of the key top 161, while opposing the first slant surface 162, a hinge protrusion 164 formed on a lateral surface of the key 151, a latching protrusion 165 positioned on the front surface of the key 151, while opposing the hinge protrusion 164 to constrain the upward movement of the key, and a pressing protrusion 166 positioned on the bottom surface of the key. The key top 161 is positioned near to the front surface of the key 151 and far from the hinge protrusion 164. The first and second slant surfaces 162 and 163 are provided for the convenience in key pressing.

In practice, a key pressing operation is convenient when the top surfaces of the keys have the shape of a step. The key top 161 extends linearly on the top surface of the key. Therefore, the key top extends linearly along the traverse direction of the keys. The keys 150 are preferably made up of hard plastic or metal material.

Figure 6:
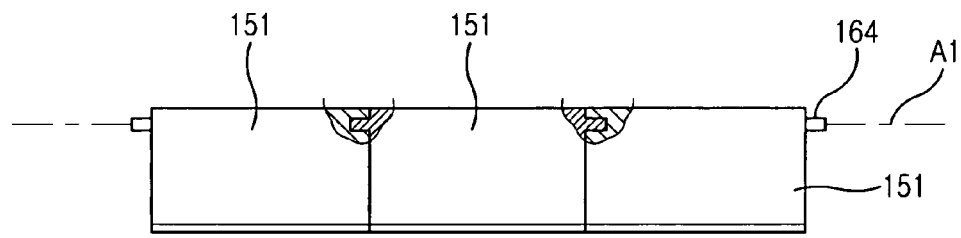
FIG. 6 is a partially-broken front view illustrating the interconnection among traverse keys according to a preferred embodiment of the present invention.

FIG. 6 illustrates an example of the interconnection among the traverse keys 151. More specifically, the traverse keys 151 are coaxially arranged about a hinge axis A1 and are connected to each other by respective hinge protrusions 164.

Figure 7:
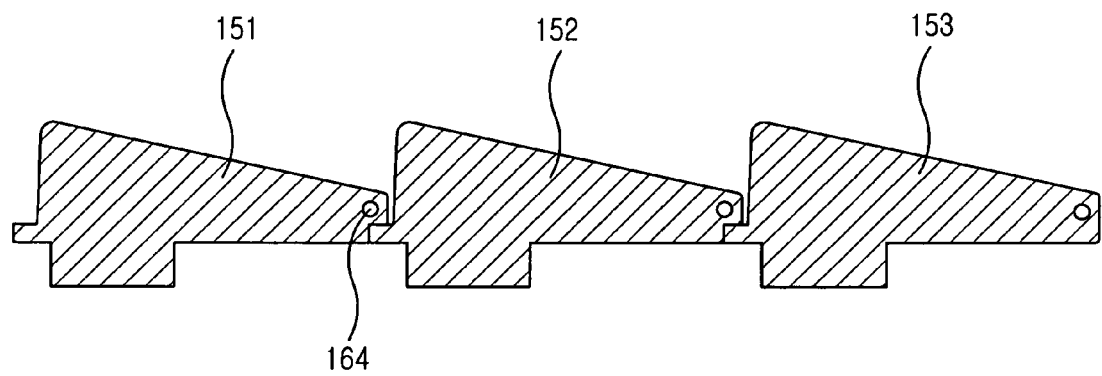
FIG. 7 is a sectional view illustrating an interconnection among longitudinal keys according to a preferred embodiment of the present invention.

FIG. 7 illustrates an example of the interconnection among three of the longitudinal keys 151, 152, and 153.

Accordingly, when the sliding housing 200 is closed as illustrated in FIG. 1, the top surfaces of the keys 150 are slightly moved down and face the bottom surface 202 of the sliding housing. Additionally, when the sliding housing 200 is opened as illustrated in FIG. 2, the top surfaces of the keys 150 are exposed in the shape of a step. The keys 150 are then ready for convenient key pressing operation.

Referring to FIG. 5, for example, the elastic body is made up of a spring 170, preferably a compression coil spring. The spring 170 has an end supported on the substrate 172 of the main housing and the other end supported on the bottom surface of the key 151 and provides an elastic force in such a direction that the key is moved away from the substrate 172. The elastic body 170 provides a force to move the keys 151 up. Preferably, the elastic body 170 deviates from the center of the bottom surface of the key 151 and is positioned vertically below the key top 161, instead of being symmetrically arranged about the center.

As described above, the present invention provides a sliding-type portable communication apparatus having keys adapted to rotate a predetermined angle to be moved up, when the sliding housing slides to open, for convenient key pressing operation.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A sliding-type portable communication apparatus, comprising:
   a main housing having a top surface;
   a sliding housing having a bottom surface and slidably coupled to the main housing;
   a plurality of keys arranged in a predetermined position on the top surface, the keys moving up and being exposed in a step formation while the sliding housing sliding over the top surface to an opened position, and the keys moving down and being hidden while the sliding housing sliding over the top surface to a closed position, the bottom surface always facing the top surface; and
   an elastic body for providing an upward force for moving the keys up.

2. The portable communication apparatus as claimed in claim 1, wherein the plurality of keys are moved down by sliding surface contact with the bottom surface.

3. The portable communication apparatus as claimed in claim 1, wherein each of the plurality of keys is adapted to rotate about a hinge axis such that a top section of the key is rotated up when as the sliding housing is opened.

4. The portable communication apparatus as claimed in claim 3, wherein the hinge axis is perpendicular to the sliding direction of the sliding housing.

5. The portable communication apparatus as claimed in claim 1, wherein the plurality of keys are arranged perpendicularly to the sliding direction of the sliding housing.

6. The portable communication apparatus as claimed in claim 1, wherein the plurality of keys are arranged successively in the sliding direction of the sliding housing, and successively in a direction perpendicular to the sliding direction, in a matrix shape.

7. The portable communication apparatus as claimed in claim 1, wherein the plurality of keys are arranged in traverse and longitudinal directions and the plurality of keys arranged in the traverse direction are connected to each other along a hinge axis.

8. The portable communication apparatus as claimed in claim 1, wherein each of the plurality of key comprises:
   a key top positioned on the top surface;
   a first slant surface positioned adjacent to a side of the key top;
   a vertical surface positioned adjacent to another side of the key top;
   a hinge protrusion positioned on a lateral surface of the key;
   a latching protrusion positioned on an other lateral surface of the key, which opposes the hinge protrusion to constrain an upward movement of the key; and
   a pressing protrusion positioned on a bottom surface of the key.

9. The portable communication apparatus as claimed in claim 1, wherein the elastic body comprises a spring.

10. The portable communication apparatus as claimed in claim 1, wherein the elastic body is positioned in such a manner that it deviates from a center of a bottom surface of each of the plurality of keys.

11. The portable communication apparatus as claimed in claim 1, wherein a hinge axis extends along a traverse direction of the main housing and the plurality of keys are arranged in the longitudinal direction of the main housing.

12. The portable communication apparatus as claimed in claim 1, wherein the plurality of keys are constructed of at least one of a plastic material and a metal material.

13. The portable communication apparatus as claimed in claim 1, wherein top surfaces of the keys face the bottom surface at the closed position.

14. The portable communication apparatus as claimed in claim 1, wherein the plurality of keys are positioned adjacent to each other in traverse and longitudinal directions.

15. The portable communication apparatus as claimed in claim 1, wherein tops of the plurality of keys extend linearly along a traverse direction of the main housing.

* * * * *